(12) United States Patent
Egawa

(10) Patent No.: US 8,736,742 B2
(45) Date of Patent: May 27, 2014

(54) IMAGE PICKUP APPARATUS THAT PERFORMS AUTOMATIC FOCUS CONTROL AND CONTROL METHOD FOR THE IMAGE PICKUP APPARATUS

(75) Inventor: Akira Egawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/319,888

(22) PCT Filed: Jul. 22, 2010

(86) PCT No.: PCT/JP2010/062736
§ 371 (c)(1),
(2), (4) Date: Nov. 10, 2011

(87) PCT Pub. No.: WO2011/013725
PCT Pub. Date: Feb. 3, 2011

(65) Prior Publication Data
US 2012/0113313 A1    May 10, 2012

(30) Foreign Application Priority Data

Jul. 27, 2009   (JP) .................................. 2009-174444

(51) Int. Cl.
*H04N 5/232* (2006.01)
*G03B 13/00* (2006.01)
*G03B 13/34* (2006.01)

(52) U.S. Cl.
USPC ............ 348/349; 348/353; 396/100; 396/123

(58) Field of Classification Search
USPC .............. 348/222.1, 345, 349, 350, 353–356; 396/89–152
See application file for complete search history.

(56) References Cited

U.S. PATENT DOCUMENTS

| | | | | |
|---|---|---|---|---|
| 5,856,664 | A * | 1/1999 | Suzuki et al. | 250/201.2 |
| 7,565,072 | B2 * | 7/2009 | Ito | 396/121 |
| 2003/0189662 | A1 * | 10/2003 | Matsuda | 348/345 |
| 2008/0025713 | A1 * | 1/2008 | Yasuda | 396/104 |
| 2008/0198257 | A1 * | 8/2008 | Morimoto | 348/345 |

FOREIGN PATENT DOCUMENTS

| | | |
|---|---|---|
| JP | 3592147 B | 11/2004 |
| JP | 2006-171381 A | 6/2006 |
| JP | 2006-350188 A | 12/2006 |
| JP | 2007-148242 A | 6/2007 |
| JP | 2009-115893 A | 5/2009 |

* cited by examiner

*Primary Examiner* — Sinh Tran
*Assistant Examiner* — Mark Monk
(74) *Attorney, Agent, or Firm* — Cowan, Liebowitz & Latman, P.C.

(57) ABSTRACT

An image pickup apparatus that can efficiently obtain an offset between focal positions detected in phase difference-based focus detection and contrast-based focus detection by using results of phase difference-based focus detection at multiple points. Focal positions in a plurality of regions based on a pair of image signals obtained from different pupils are obtained. A focal position for a focus lens at which a contrast of image signals for image pickup is at a peak is detected. A target focal position is determined from the plurality of focal positions. When another focal position is present between a present focal position and the target focal position, an offset between a focal position of the focus lens at which the contrast detected at the other focal position while the focus lens is moving is at a peak and the other focal position is calculated.

4 Claims, 11 Drawing Sheets

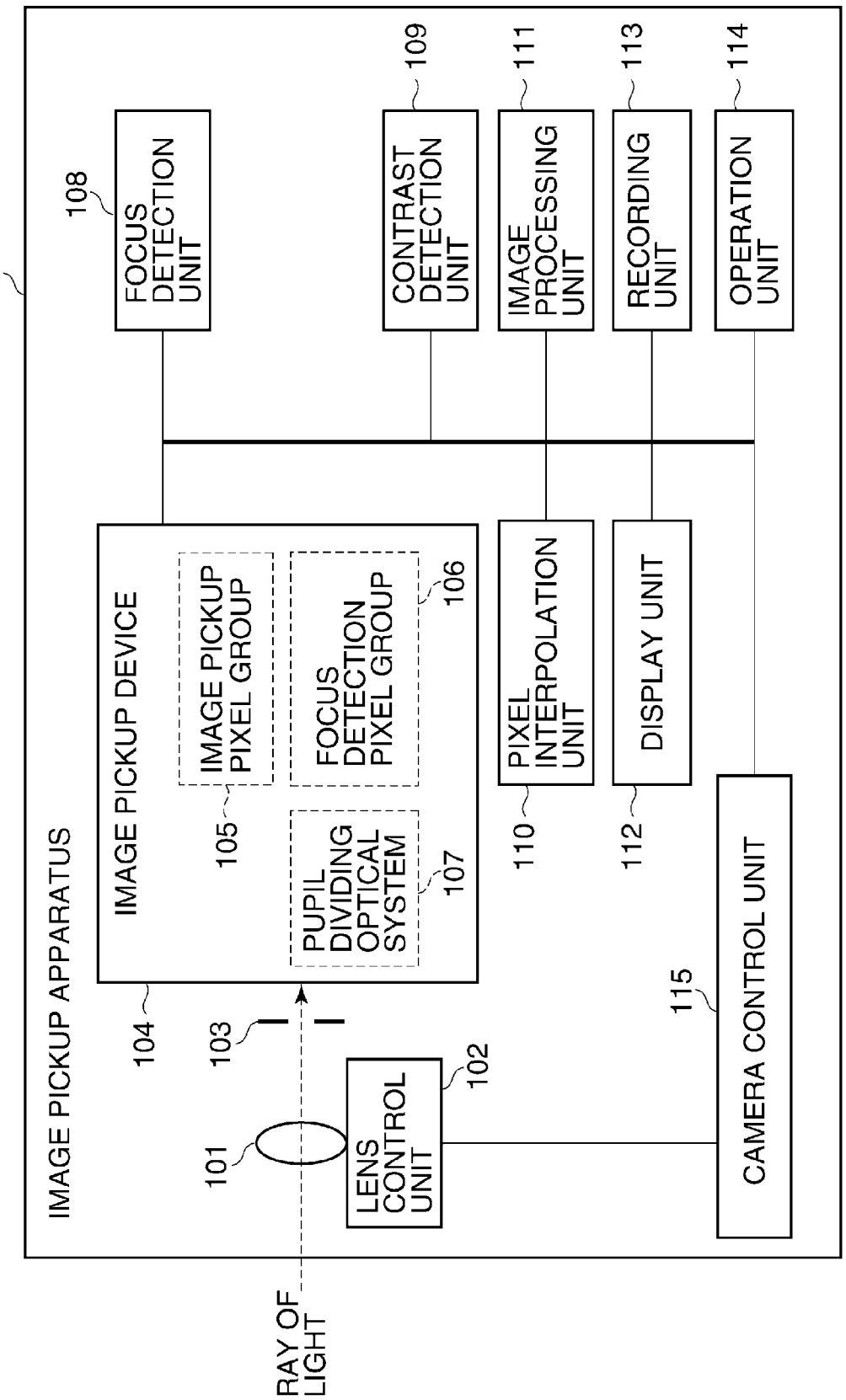

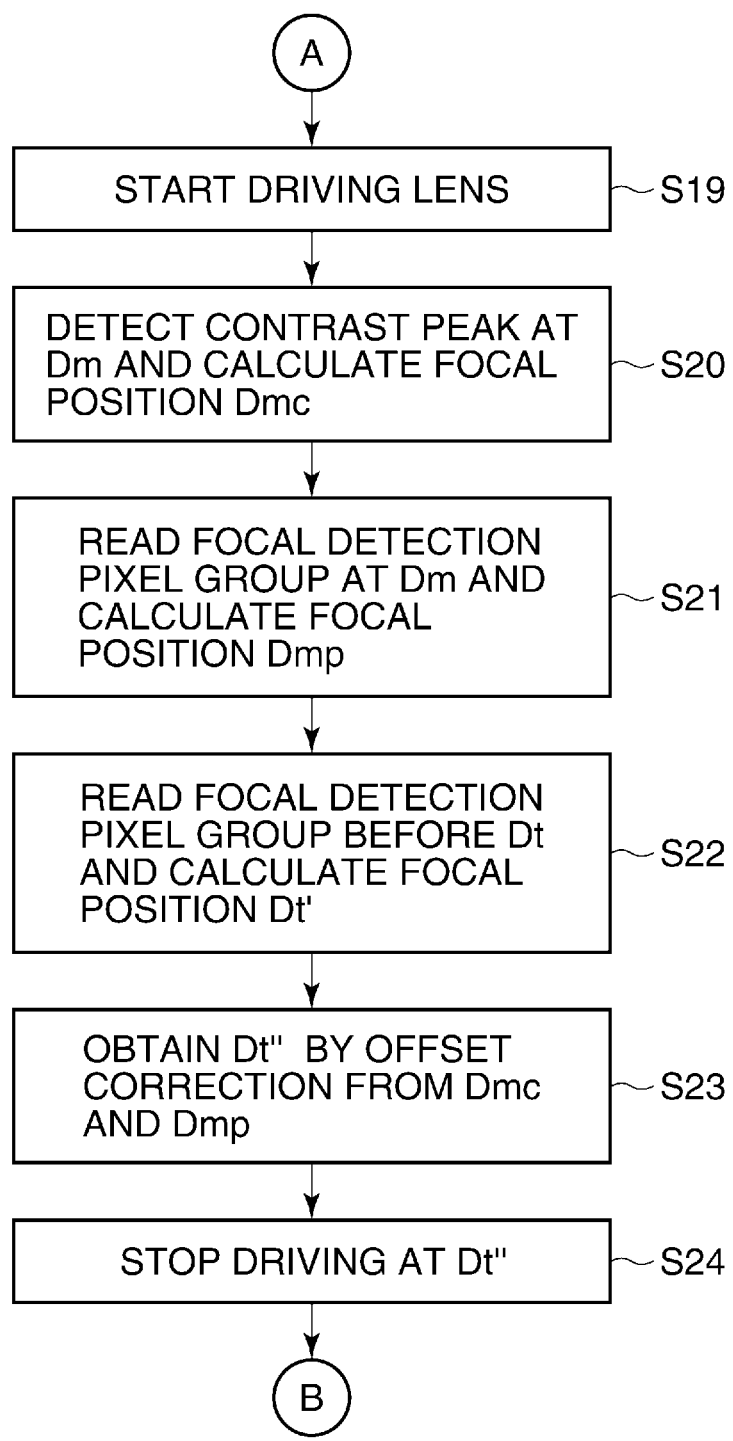

IMAGE PICKUP APPARATUS THAT PERFORMS AUTOMATIC FOCUS CONTROL AND CONTROL METHOD FOR THE IMAGE PICKUP APPARATUS

TECHNICAL FIELD

The present invention relates to an image pickup apparatus such as a digital camera, and in particular to an image pickup apparatus that performs automatic focus (AF) control, and a control method for the image pickup apparatus.

BACKGROUND ART

Conventionally, image pickup apparatuses such as compact digital cameras perform contrast-based focus detection using an image pickup device. Contrast-based focus detection enables accurate automatic focus control using image signals output from an image pickup device. For this reason, it has been proposed that in digital single-lens reflex cameras, after mirror lock-up after phase difference-based focus detection, contrast-based focus detection is performed in the same focus detection area.

As described above, contrast-based focus detection enables more accurate automatic focus control than in phase difference-based focus detection. A reason that can be given for this is that in contrast-based focus detection, outputs from an image pickup device are used, whereas in phase difference-based focus detection, focus adjustment units are on different optical paths, and aberration resulting from mechanical optical-path difference and different pupils is corrected for.

FIG. 6 is a diagram useful in explaining an operation in a case where focus control is performed in a selected focus detection area. In the figure, the abscissa indicates the camera-to-subject distance, and after mirror lock-up after a selected subject is focused on by an AF unit in a mirror-down state, focus scan is performed before and after a focal position so as to detect a contrast peak. In the figure, the arrow A indicates a movement of a lens, a face at a position indicated by the arrow B is a target focal position, and the waveform C indicates a peak of contrast evaluation values (PTL (Patent Literature) 1).

Also, there has been proposed the technique that part of pixels of an image pickup device are provided with different optical characteristics from those of other pixels and used for focus detection so as to dispense with a secondary optical system for conventional focus detection (PTL (Patent Literature) 2).

CITATION LIST

Patent Literature

{PTL 1} Japanese Laid-Open Patent Publication (Kokai) No. 2006-350188
{PTL 2} Japanese Patent Publication No. 3592147

SUMMARY OF INVENTION

Technical Problem

In PTL 1 and PTL described above, however, when focus detection is performed in a plurality of areas, that is, at multiple points, unselected focus detection results obtained outside a focus detection area are not effectively used for focus control. Moreover, when focus control is performed so as to bring a plurality of subjects close to each other into a depth of field, there may be a case where there is no subject at a target focal position, and contrast-based focus detection cannot be performed, or it is necessary to perform contrast-based focus detection with respect to each of the plurality of subjects.

The present invention provides an image pickup apparatus and a control method for the image pickup apparatus that can efficiently obtain an offset between focal positions obtained in phase difference-based focus detection and contrast-based focus detection by using results of phase difference-based focus detection at multiple points.

Solution to Problem

Accordingly, in a first aspect of the present invention, there is provided an image pickup apparatus comprising an image pickup device comprising an image pickup pixel group and a focus detection pixel group, a first focus detection unit that obtains focal positions in a plurality of regions based on a pair of image signals obtained from different pupils by the focus detection pixel group, a second focus detection unit that detects a focal position for a focus lens at which a contrast of image signals from the image pickup pixel group is at a peak, a determination unit that determines a target focal position from the plurality of focal positions obtained by the first focus detection unit, and a calculation unit that, when another focal position detected by the first focus detection unit is present between a present focal position and the target focal position, calculates an offset between a focal position of the focus lens at which the contrast detected at the other focal position by the second focus detection unit while the focus lens is moving is at a peak and the other focal position.

Accordingly, in a second aspect of the present invention, there is provided a control method for an image pickup apparatus comprising an image pickup device having an image pickup pixel group, and a focus detection pixel group, comprising a first focus detection step of obtaining focal positions in a plurality of regions based on a pair of image signals obtained from different pupils by the focus detection pixel group, a second focus detection step of detecting a focal position for a focus lens at which a contrast of image signals from the image pickup pixel group is at a peak, a first determination step of determining a target focal position from the plurality of focal positions obtained in the first focus detection step, a second determination step of determining whether another focal position is present between a present focal position and the target focal position, and a calculation step of, when it is determined in the second determination step that the other focal position is present, calculating a focal position offset based on a focal position obtained based on the contrast peak position detected at the other focal position in the second focus detection step while the focus lens is moving and a focal position obtained from an amount of defocus in the first focus detection step.

Advantageous Effects of Invention

According to the present invention, an offset between focal positions obtained in phase difference-based focus detection and contrast-based focus detection can be efficiently obtained by using results of phase difference-based focus detection at multiple points.

The features and advantages of the invention will become more apparent from the following detailed description taken in conjunction with the accompanying drawings.

BRIEF DESCRIPTION OF DRAWINGS

FIG. 1 is a block diagram useful explaining an exemplary schematic arrangement of an image pickup apparatus given as an embodiment of the present invention.

FIGS. 2A and 2B are flowcharts useful in explaining exemplary automatic focus control in the image pickup apparatus.

DESCRIPTION OF EMBODIMENTS

Figure 2A:
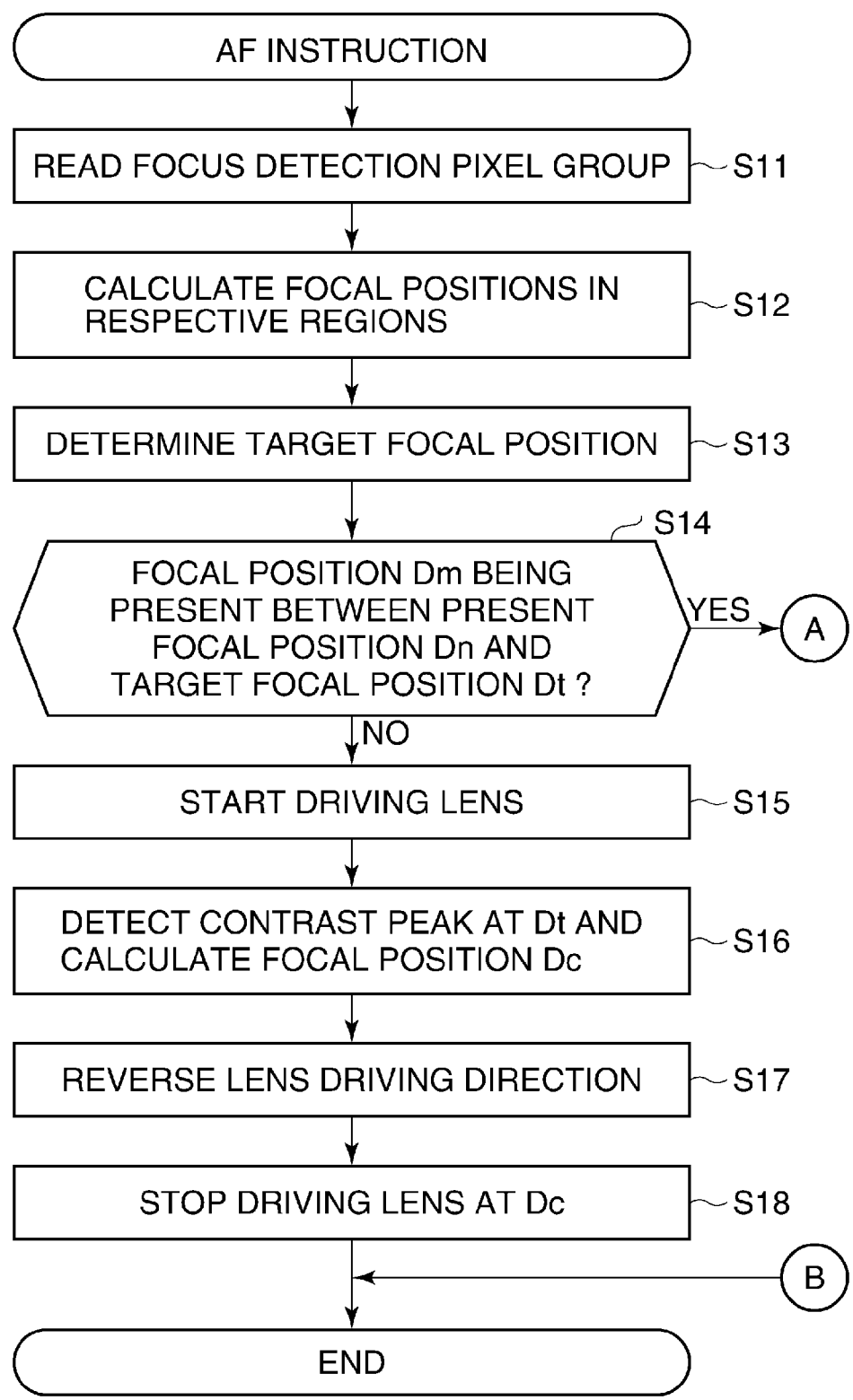

An embodiment of the present invention will now be described in detail with reference to the drawings.

FIG. 1 is a block diagram useful explaining an exemplary schematic arrangement of an image pickup apparatus given as an embodiment of the present invention.

Referring to FIG. 1, the image pickup apparatus 100 according to the present embodiment has a focus lens 101 for focusing on a subject, a lens control unit 102 that controls a focal position for the focus lens 101, and a diaphragm 103 that controls an amount of incident light. The image pickup apparatus 100 also has an image pickup device 104 comprised of a CMOS, a CCD, or the like.

The image pickup device 104 has an image pickup pixel group 105, a focus detection pixel group 106, and a pupil dividing optical system 107.

The image pickup pixel group 105 has a plurality of pixels having R, G, and B color filters provided on a light-receiving surface thereof and used to obtain image signals for image pickup. The focus detection pixel group 106 has a plurality of pairs of focus detection sensors (see FIGS. 7 to 10B) that are in a plurality of focus detection regions, disposed symmetrically with respect to an optical axis, and have different optical characteristics. The field of view of the focus detection pixel group 106 is limited by light-shielding layers 503 and 603 (see FIGS. 8 and 9). The pupil dividing optical system 107 limits incident rays of light so that a pupil can be divided symmetrically with respect to an optical axis for a pair of focus detection sensors of the focus detection pixel group 106.

Figure 7:
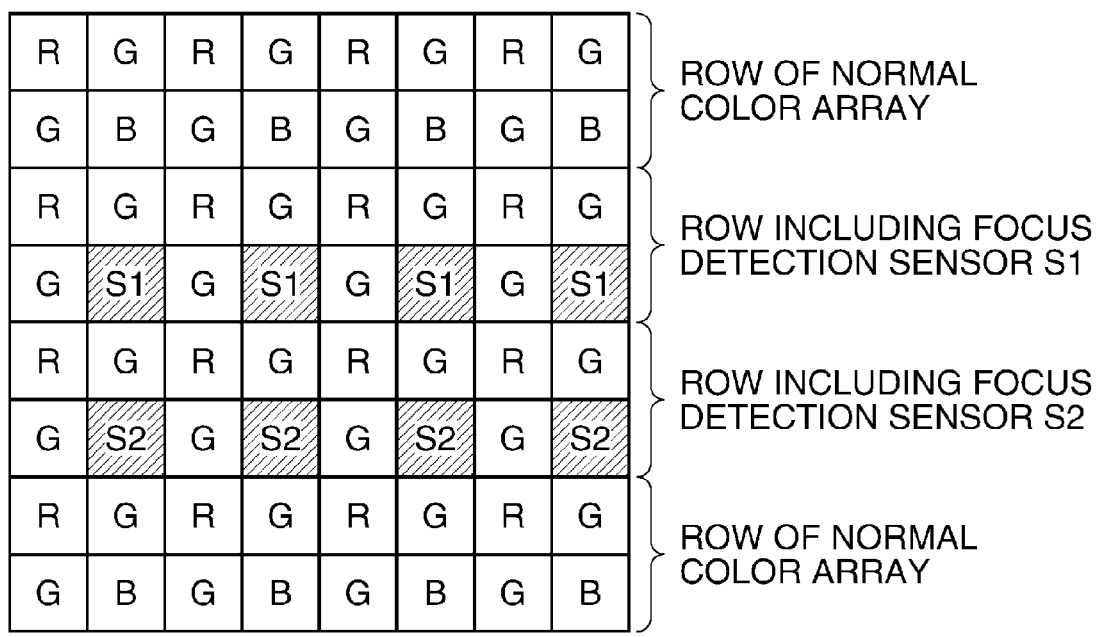
FIG. 7 is a diagram showing an exemplary pixel arrangement of an image pickup device including focus detection sensors in specific rows.

More specifically, at least one pair of focus detection sensors are disposed in part of pixels of the image pickup device 104. FIG. 7 is a diagram showing an exemplary pixel arrangement of the image pickup device including focus detection sensors in specific rows. Referring to FIG. 7, symbols R, G, and B designate pixels having a red filter, a green filter, and a blue filter, respectively, disposed on an incident plane of the image pickup device to which rays of light enter. Symbols S1 and S2 designate focus detection sensors, which have different optical characteristics.

Figure 8:
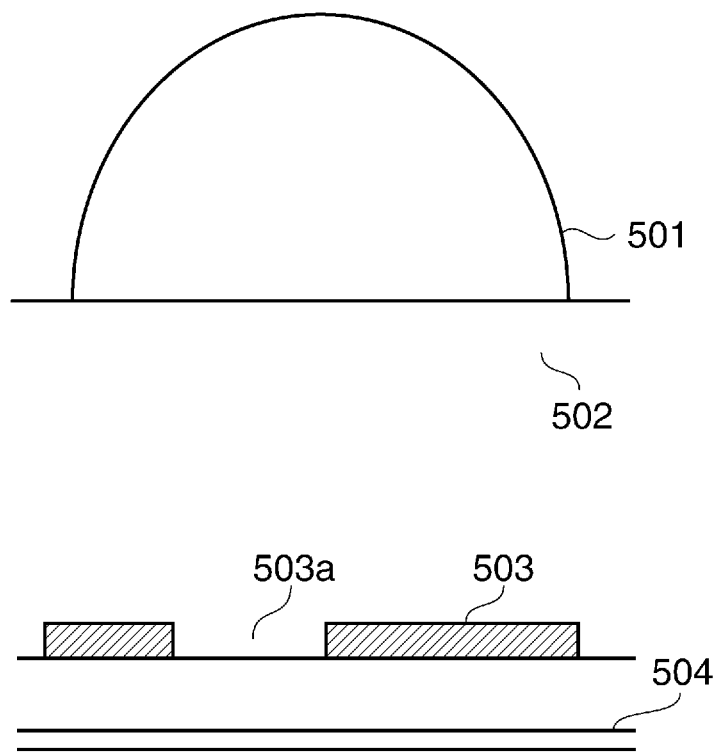
FIG. 8 is a diagram schematically showing a structure of a focus detection sensor S1.

FIG. 8 is a diagram schematically showing a structure of the focus detection sensor S1. Referring to FIG. 8, the focus detection sensor S1 has a micro lens 501, a smooth layer 502, the light-shielding layer 503, and a photoelectric conversion element 504. The micro lens 501 is disposed at the top, and the smooth layer 502 constitutes a flat surface forming the micro lens 501. The light-shielding layer 503 has an aperture 503a decentered to one side relative to a center of a photoelectric conversion area of a pixel, and has a function of reducing incident rays of light.

Figure 9:
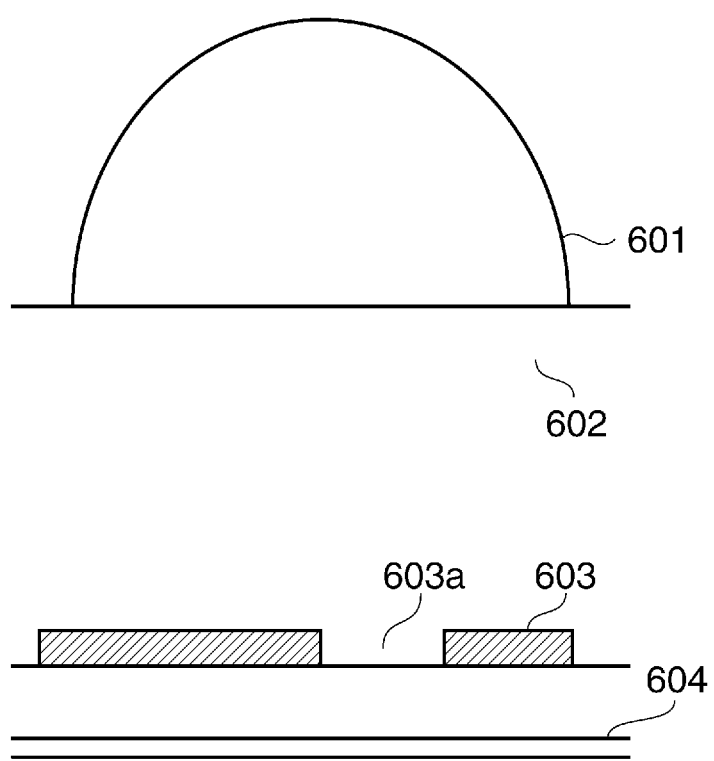
FIG. 9 is a diagram schematically showing a structure of a focus detection sensor S2.

FIG. 9 is a diagram schematically showing a structure of the focus detection sensor S2. Referring to FIG. 9, the focus detection sensor S2 has a micro lens 601, a smooth layer 602, the light-shielding layer 603, and a photoelectric conversion element 604 similar to the focus detection sensor S1. The focus detection sensor S2 differs from the focus detection sensor S1 in that an aperture 603a of the light-shielding layer 603 is decentered to the other side relative to a center of a photoelectric conversion area of a pixel.

Referring to FIG. 7, a row including the focus detection sensors S1 and a row including the focus detection sensors S2 are disposed in proximity to each other, and they form substantially the same image signals. When subject light is in focus on pixels via an image pickup optical system, an image signal from the row including the focus detection sensors S1 and an image signal from the row including the focus detection sensors S2 match each other.

In a case where subject light is out of focus, a phase difference arises between an image signal from the row including the focus detection sensors S1 and an image signal from the row including the focus detection sensors S2. Directions of the phase difference in a front focus state and in a rear focus state are opposite to each other.

When viewing the image pickup optical system from the focus detection sensor S1 and from the focus detection sensor S2, a pupil looks divided symmetrically with respect to an optical center.

Figure 10A:
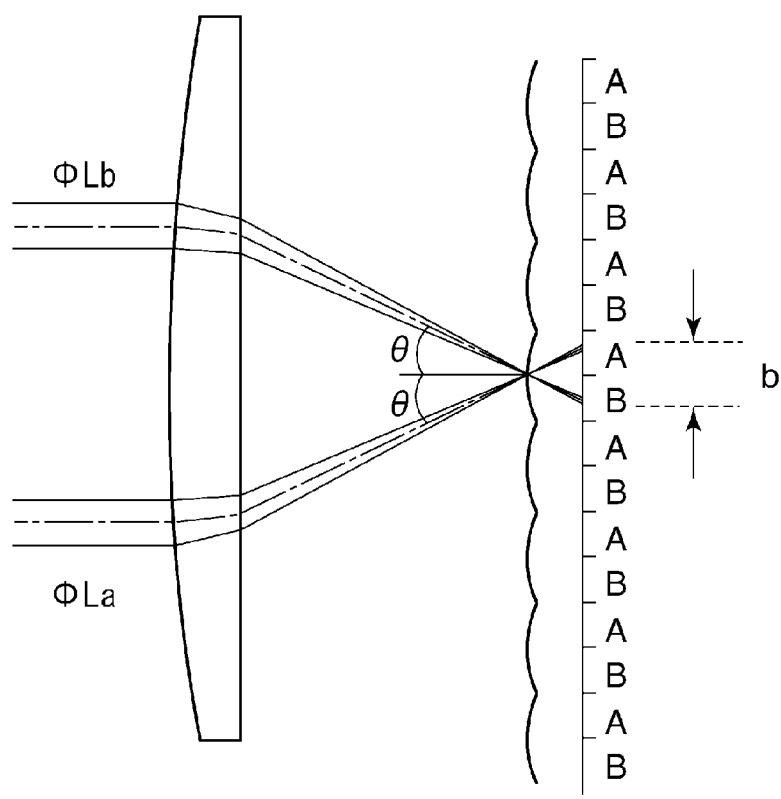
FIGS. 10A and 10B are views useful in explaining phase shift of images due to focus shift.
Figure 10B:
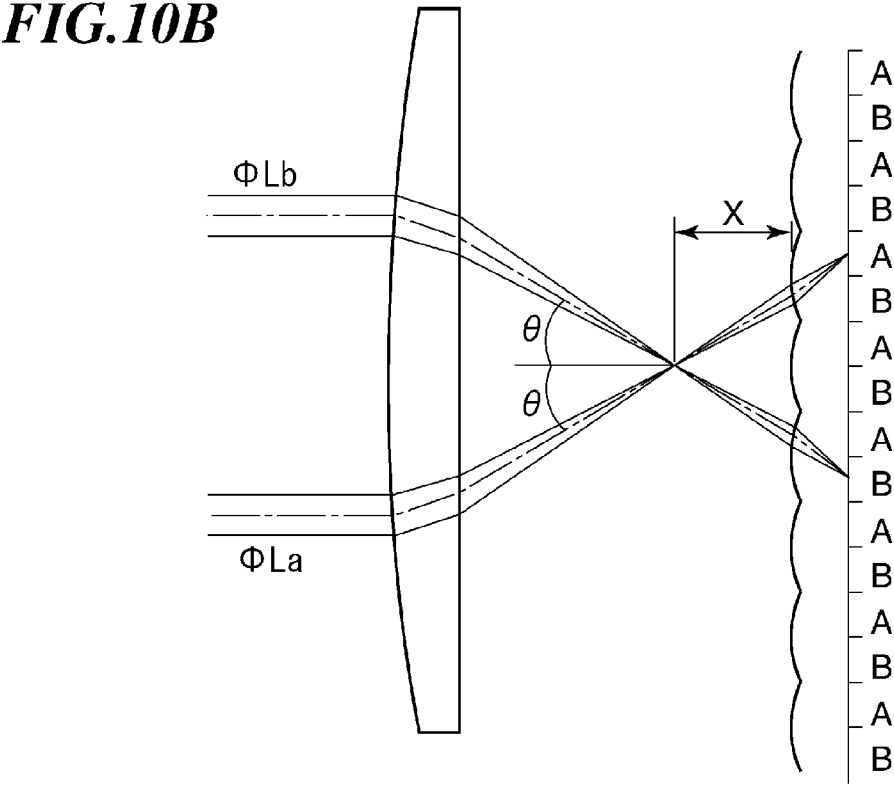

FIGS. 10A and 10B are views useful in explaining phase shift of images due to focus shift. In FIGS. 10A and 10B, portions corresponding to the focus detection sensors S1 and the focus detection sensors S2 appearing in FIG. 7 are designated by symbols A and B, respectively, and for the convenience of explanation, RGB pixels for image pickup are not shown, and the focus detection sensors are arranged side by side.

Light from a specific point on a subject is divided into a bundle of rays (ΦLa) entering a portion A through a pupil corresponding to the portion A and a bundle of rays (ΦLb) entering a portion B through a pupil corresponding to the portion B. Because these two bundles of rays are from the same one point, they reach one point on the same micro lens as long as the image pickup optical system is in focus on the image pickup device (FIG. 10A). However, for example, when the focus of the image pickup optical system is x before the image pickup device, the two bundles of rays are shifted by a change in an angle of incidence of the rays (FIG. 10B), and when the focus of the image pickup optical system is x behind the image pickup device, the two bundles of rays are shifted in the reverse direction.

Thus, when the image pickup optical system is in focus, an image signal formed in a row of A and an image signal formed in a row of B match each other, and when the image pickup optical system is out of focus, an image signal formed in a row of A and an image signal formed in a row of B do not match each other.

The image pickup apparatus 100 according to the present embodiment also has a focus detection unit 108, a contract detection unit 109, a pixel interpolation unit 110, an image processing unit 111, a display unit 112, a recording unit 113, an operation unit 114, and a camera control unit 115.

The focus detection unit 108 detects a focal position by calculating an amount of image shift between pixel rows of a pair of focus detection sensors S1 and S2 in the focus detection pixel group 106 by performing a correlation computation. The contrast detection unit 109 outputs contrast evaluation values using image signals from the image pickup pixel group 105. The pixel interpolation unit 110 interpolates image data for image pickup, which corresponds to positions of pixels in the focus detection pixel group 106, from a near pixel group.

The image processing unit 111 performs gamma correction, white-balance adjustment, re-sampling, predetermined image compression coding on image signals output from the image pickup pixel group 105. The display unit 112 displays image data output from the image processing unit 111, and the recording unit 113 records image data output from the image processing unit 111. The operation unit 114 receives operation inputs by a user. The camera control unit 115 controls the overall operation of the image pickup apparatus 100, and for example, controls the lens control unit 102 to move a lens, and carries out contrast-based AF in accordance with an output from the contrast detection unit 109.

Referring next to FIGS. 2A and 2B, a description will be given of exemplary automatic focus control in the image pickup apparatus 100 according to the present embodiment. Each process in FIGS. 22A and 2B is executed by a CPU of the camera control unit 115 or the like in accordance with a program stored in a ROM, an HDD, or the like, not shown, and loaded into a RAM.

In step S11, the camera control unit 115 reads signals from the focus detection pixel group 106, and proceeds to step S12.

In the step S12, the camera control unit 115 causes the focus detection unit 108 to perform a correlation computation on two image signals obtained from different pupils by a pair of the focus detection sensors S1 and S2 of the focus detection pixel group 106 as described above with reference to FIGS. 10A and 10B. As a result, the camera control unit 115 obtains focal positions, and proceeds to step S13.

Figure 3:
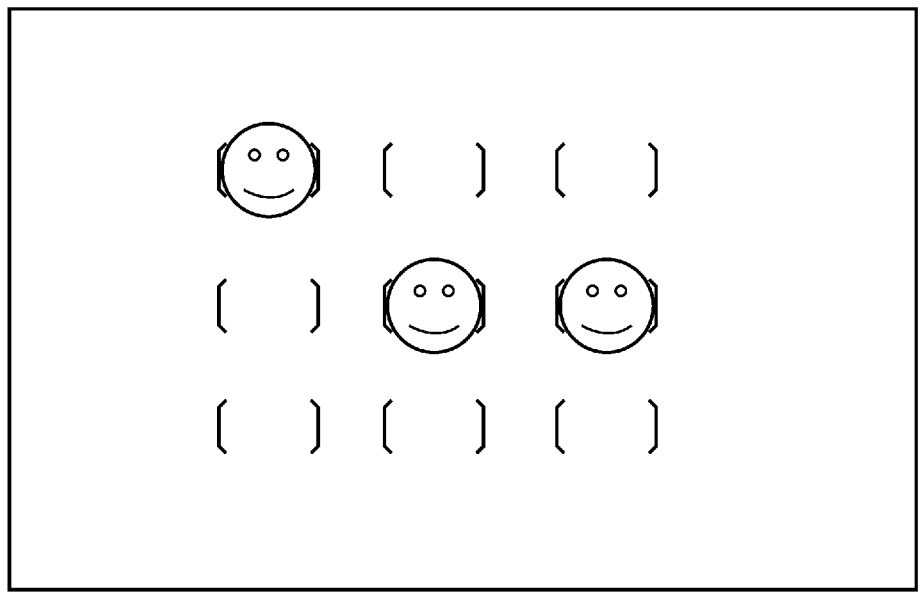
FIG. 3 is a view showing an exemplary layout of focal positions in respective nine AF regions displayed on a display unit.

On this occasion, for example, the camera control unit 115 displays focal positions in respective nine AF regions on the display unit 112 as shown in FIG. 3. In the example shown in FIG. 3, there are human faces at the upper left, center, and right middle, and focal positions thereof are obtained.

In the step S13, the camera control unit 115 determines a target focal position based on information on the focal positions in the plurality of AF regions obtained in the step S12, and proceeds to step S14.

Figure 4A:
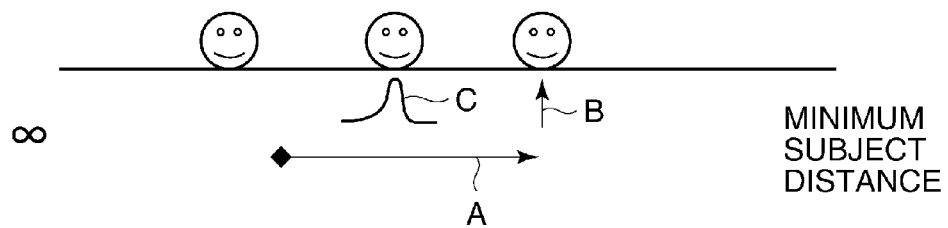
FIGS. 4A to 4C are views useful in explaining a target focal position determination process.
Figure 4B:
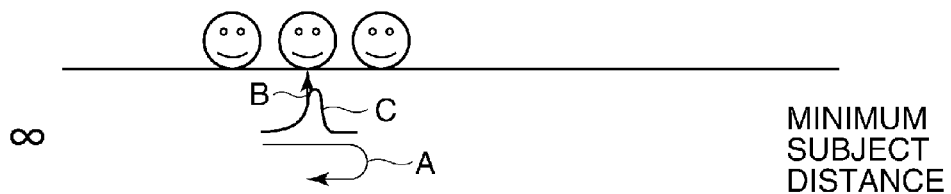
Figure 4C:
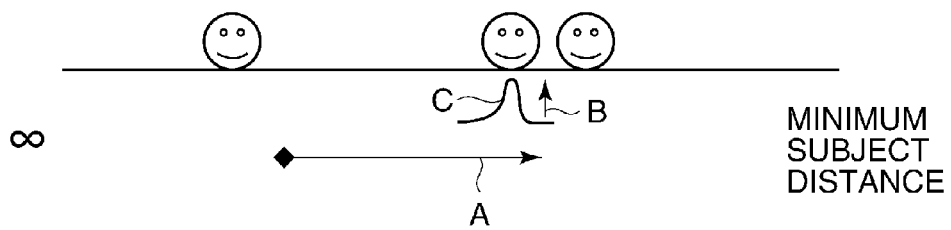

Referring now to FIGS. 4A to 4C, a description will be given of a target focal position determination process. FIGS. 4A to 4C show exemplary three patterns of positional relationships between three persons being present in a screen, in which the abscissa indicates the camera-to-subject distance, the left indicates the infinite distance, and the right indicates the minimum subject distance. Also, the arrow A indicates a movement of the focus lens 101, a face at position indicated by the arrow B is a target focal position, and the waveform C indicates a peak of contrast evaluation values.

Referring to FIG. 4A, because three persons are substantially equal distances away from each other, it is determined that they are unrelated persons, and the closest person or the person positioned in the middle is determined as a target focal position. In this example, the closest person is selected.

Referring to FIG. 4B, because three persons are relatively close to each other, it can be determined that this is a group photograph, and in this case, a position at which focal positions of all the three persons are inside the depth of field is determined as a target focal position.

Referring to FIG. 4C, because two persons are close to each other, it is determined that they are related persons, and because the other one person is away from the two persons, it is determined that he/she is an unrelated person. In this case, a position at which the two persons close to each other are inside the depth of field is determined as a target focal position.

In the step S14, the camera control unit 115 determines whether or not another focal position Dm is present between a present focal position Dn and a target focal position Dt, and when the focal position Dm is present, the camera control unit 115 proceeds to step S19, and when the focal position Dm is not present, the camera control unit 115 proceeds to step S15.

In the step S19, the camera control unit 115 causes the lens control unit 102 to move the focus lens 101 along the optical axis and shift the focal position, and proceeds to step S20.

In the step S20, the camera control unit 115 causes the contrast detection unit 109 to obtain a peak position of the subject at the focal position Dm being present while the focal lens 101 is moving, and obtains a focal position Dmc by interpolating the peak position, and proceeds to step S21.

In the step S21, the camera control unit 115 reads signals from the focus detection pixel group 106 at the focal position Dm, and causes the focus detection unit 108 to obtain again a focal position Dmp of the subject in a manner similar to the above described manner, and then proceeds to step S22. The focal positions obtained in the step S20 and the step S21 have only to be in the vicinity of the focal position Dm being present between the present focal position Dn and the target focal position Dt. Also, in the step S21, the focal position Dmp is obtained from the amount of defocus in phase difference-based AF.

In the step S22, the camera control unit 115 causes the focus detection unit 108 to obtain a focal position Dt' of the subject again before the target focal position Dt in a manner similar to the above described manner, and then proceeds to step S23. Because the value of the focal position Dt' is obtained in the vicinity of the target focus position Dt, accuracy can be further improved.

In the step S23 the camera control unit 115 calculates an offset from the focal positions Dmc and Dmp obtained in the step S20 and the step S21, corrects the focal position Dt' obtained in the step S22 to obtain a focal position Dt", and then proceeds to step S24.

Figure 5A:
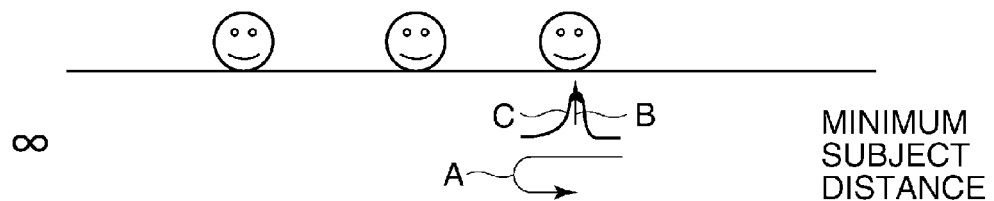
FIGS. 5A to 5C are views useful in explaining the target focal position determination process.
Figure 5B:
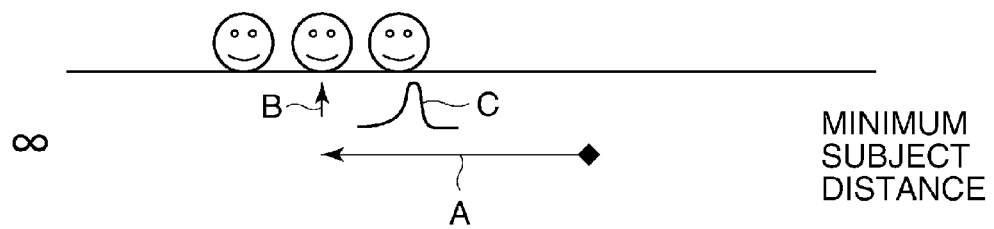

In the step S24, the camera control unit 115 controls the lens control unit 102 to stop moving the focus lens 101 at the focal position Dt" obtained in the step S23, and terminates the process. It should be noted that the processes in the steps S22 and the step S23 may be repeated a predetermined number of times between the step S21 and the step S24. The operation in the steps S19 to S24 corresponds to FIGS. 4A, 4C, and 5B.

On the other hand, in the step S15, the camera control unit 115 causes the lens control unit 102 to move the focus lens 101 along the optical axis and move the focal position, and proceeds to step S16.

In the step S16, the camera control unit 115 obtains a focal position Dc by detecting a peak position from an output from the contrast detection unit 109 at the target focal position Dt, and proceeds to step S17.

In the step S17, the camera control unit 115 causes the lens control unit 102 to reverse the moving direction of the focus lens 101, and proceeds to step S18.

Figure 5C:
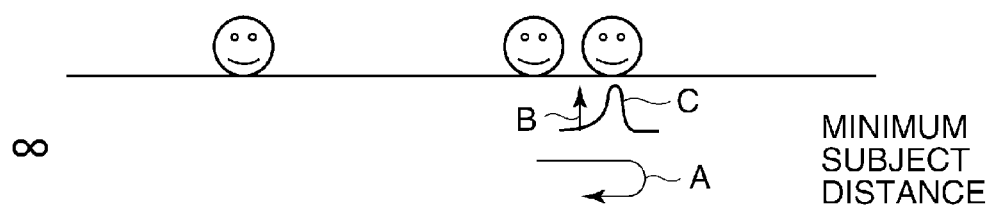
Figure 6:
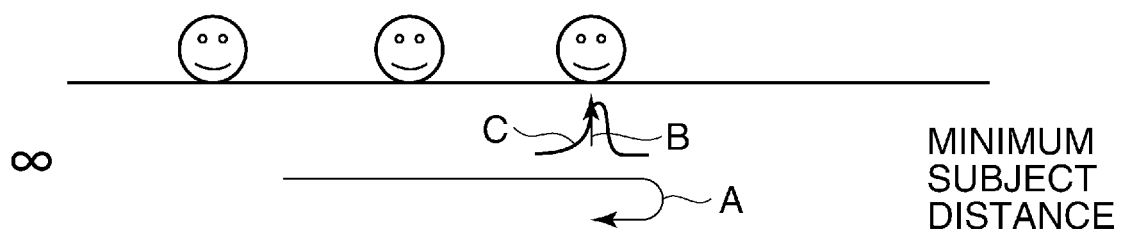
FIG. 6 is a view useful in explaining an operation in a case where focus control is performed only in a selected focus detection area according to a prior art.

In the step S18, the camera control unit 115 causes the lens control unit 102 to stop moving the focus lens 101 at the focal position Dc obtained in the step S16, and terminates the process. It should be noted that the operation in the steps S15 to S18 corresponds to FIGS. 4B, 5A, and 5C. FIGS. 4B and 5C show a state in which a target focal position is set so that a plurality of subjects can be inside the depth of field, but control is provided by obtaining an offset from one subject.

As described above, according to the present embodiment, a target focal position is determined using results of phase difference-based AF at multiple points, contrast-based AF is performed in a region where a subject is present while the lens is moving, and a focal position offset is obtained. Thus, focus control for detecting a peak position at a target focal position can be dispensed with, and the time to reverse the lens moving direction after detection of a peak can be saved. As a result, an offset between a focal position in phase difference-based AF and a focal position in contrast-based AF can be efficiently obtained by using results of phase difference-based AF at multiple points.

Moreover, even in a case where contrast-based AF cannot be performed at a target focal position when a plurality of subjects being at different distances are controlled into the depth of field, a focal position in the vicinity of the target focal position is used, and hence focus control can be performed with high accuracy.

It should be noted that the present invention is not limited to the embodiment described above, but various changes in or to the above described embodiment may be possible without departing from the spirits of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 Image pickup apparatus
101 Focus lens
102 Lens control unit
105 Image pickup pixel group
106 Focus detection pixel group
107 Pupil dividing optical system
108 Focus detection unit
109 Contrast detection unit
110 Pixel interpolation unit
111 Image processing unit
115 Camera control unit

The invention claimed is:

1. An image pickup apparatus comprising:
an image pickup device comprising an image pickup pixel group and a focus detection pixel group;
a first focus detector that obtains focal positions in a plurality of regions based on a pair of image signals obtained from different pupils by the focus detection pixel group;
a second focus detector that detects a focal position for a focus lens at which a contrast of image signals from the image pickup pixel group is at a peak;
a determination processor that determines a target focal position from the plurality of focal positions obtained by said first focus detector unit; and
a calculation processor that, when another focal position detected by said first focus detector is present between a present focal position and the target focal position, calculates an offset between a focal position of the focus lens at which the contrast detected at the other focal position by said second focus detector while the focus lens is moving is at a peak and the other focal position.

2. An image pickup apparatus according to claim 1, further comprising a correction processor that, based on the offset between the focal positions calculated by said calculation processor, corrects the focal position obtained by said first focus detector in a vicinity of the target focal position.

3. An image pickup apparatus according to claim 1, wherein when no other focal position is present between a present focal position and the target focal position, said second focus detector detects a position of the focus lens at which a contrast of image signals from the image pickup pixel group is at a peak in a vicinity of the target focal position.

4. A control method for an image pickup apparatus comprising an image pickup device having an image pickup pixel group, and a focus detection pixel group, comprising:
obtaining focal positions in a plurality of regions based on a pair of image signals obtained from different pupils by the focus detection pixel group;
detecting a focal position for a focus lens at which a contrast of image signals from the image pickup pixel group is at a peak;
determining a target focal position from the plurality of focal positions obtained in said step of obtaining focal positions;
determining whether another focal position is present between a present focal position and the target focal position; and
when it is determined that the other focal position is present, calculating a focal position offset based on a focal position obtained based on the contrast peak position detected at the other focal position in said step of detecting a focal position for a focus lens while the focus lens is moving and a focal position obtained from an amount of defocus in said step of obtaining focal positions.

* * * * *